Patented Dec. 7, 1943

2,336,171

UNITED STATES PATENT OFFICE 2,336,171

OIL WELL DRILLING FLUID

John W. Freeland, San Francisco, and Harold T. Byck, Berkeley, Calif., assignors to Shell Development Company, San Francisco, Calif., a corporation of Delaware No Drawing. Application June 22, 1940,
Serial No. 341,964

8 Claims. (Cl. 252—8.5)

This invention pertains to improvements in oil well drilling fluids and relates more particularly to an improved drilling fluid containing Irish moss as a plastering or protective agent.

This application is a continuation-in-part of our copending application, Serial No. 283,970, filed July 12, 1939, now Patent No. 2,211,688, dated Aug. 13, 1940.

The functions of a drilling fluid are to lubricate and cool the bit, to carry the cuttings from the bit to the surface, to control formation pressures, and to form on the walls of the borehole a thin, adherent, impermeable sheath capable of preventing or minimizing the penetration of the drilling fluid into the formation, and its loss therein.

As the drilling fluid is circulated in the borehole under a pressure exceeding that of the formation, its liquid component, together with the smaller colloidal or solid particles suspended therein, flows into the formation through the interstices, passages and pores between the grains of the formation sands. The larger clay or solid particles, however, become arrested between adjacent sand grains and act as plugs, decreasing the area of the flow passages therebetween, and allowing smaller clay particles to become in turn arrested and to act as plugs in said smaller passages. In the plugging of these smaller pores, the thixotropic structure developed by the drilling fluid serves as a support or mesh on which the smaller clay particles build. A drilling fluid of good plastering properties quickly forms in this manner a substantially liquid-impervious mud sheath on the walls of the borehole.

Unfortunately, however, these properties, commonly referred to as plastering properties, are particularly sensitive to certain types of contamination frequently encountered during drilling, namely, contamination with salts capable of causing a partial or complete flocculation of the clay colloids of the drilling fluid. The flocculation of the clay colloids, that is, the agglomeration and aggregation of the small colloidal particles into larger non-colloidal particles, precludes the formation of a thixotropic structure by the drilling fluid and/or the plugging of the smaller pores or passages in the walls of the borehole and thus leads to a great loss of water or liquid from the drilling fluid into the formation. For example, a drilling fluid under 500 lbs. pressure lost 25.5 cc. of water through a porous filter in thirty minutes; the same drilling fluid containing 10% common salt lost 54.0 cc. of water in the same time. This impairment of the plastering properties of the drilling fluid may be brought about by the natural salinity of the brines encountered or by the penetration of salt domes by the drill where the solution of the formation quickly flocculates the drilling fluid, or by the necessity, for want of fresh water, of using sea water or other low quality water in making up the fluid. The plastering properties of drilling fluids are likewise impaired by increased temperature of the drilling fluid due to its contact with subsurface strata at elevated temperature and its absorption of the heat generated by the bit in penetrating the rock, which is one of the functions of a drilling fluid. This temperature increase causes temperature flocculation of the colloidal particles, flocculation due to increased solubility of flocculating salts, and accelerated flocculation by salts at elevated temperature as well as increased fluidity of the liquid medium in the drilling fluid. For example, the percentage increase in water loss from 70° F. to 175° F. for a group of six California muds ranged from about 65% to 157%.

It is therefore an object of the present invention to provide a drilling fluid of improved plastering properties, which is capable of forming a thin, adherent, and impermeable mud sheath on the walls of the borehole to prevent loss of fluid into the formation.

It is another object of the invention to provide a drilling fluid of improved plastering properties, which properties are substantially unaffected by salt contaminations, or by standing for considerable periods of time.

It is still another object of this invention to provide a drilling fluid of improved plastering properties, which may be prepared with salt water as the liquid component.

It is a further object of the invention to provide a drilling fluid of improved plastering properties, which properties are not greatly affected by high well temperatures.

Another object of this invention is to provide a method of attaining the above objects by means of a small amount of a material, which is inexpensive, non-corrosive, non-poisonous, and non-volatile.

Briefly, the method of the present invention comprises dispersing in the drilling fluid a small amount of Irish moss obtained by drying the seaweed *Chondrus crispus*.

While it has already been known to add to drilling fluids various substances extracted, leached, or chemically prepared from seaweeds such, for example, as alginates, agar-agar, etc., the use of Irish moss offers the following advantages over the use of these agents; first, Irish moss may be used in its natural or dried form, and is therefore economically more attractive than said extracts, the costly chemical processes of preparation being dispensed with; and second, the Irish moss used in its natural form is more effective than the concentrated extracts from other seaweeds hitherto used for the same purpose, as will be shown hereinbelow.

In applying the process of the present invention during drilling of a well for the purpose of forming a mud sheath of particular strength on the walls of the borehole to prevent the escape of gases and to avoid the infiltration of water into the well or a loss of the circulation fluid into porous formations, and particularly in the event where the drilling fluid is liable to be contaminated by salts or subjected to increased temperatures, an aqueous dispersion of Irish moss containing in suspension materials such as clay, shale, limestone and/or, if desired, suitably ground weighting material such as barytes, galena, iron or lead oxide, oyster shells, etc., may be used for forming the drilling fluid alone or in combination, if desired, with a compound or mixture of compounds known as viscosity reducers, such as the water-soluble salts of organic materials of feebly-acidic properties such as tannins, humins, lignins, extracts of wood, such as quebracho extract, etc., in admixture with alkali hydroxides, the water-soluble alkali metal pyrophosphates, meta-phosphates, hexa-phosphates, polyphosphates, etc. In general, the use of a mixture of a material such as quebracho extract and sodium hydroxide, which is commercially known as quebracho-soda, is preferred. As will be shown hereinbelow, the object of adding these agents is not to reduce the viscosity of the drilling fluid but to enhance the action of the Irish moss in combating the effects of salt contamination, high temperatures, etc. Suspensions containing from about 0.1% to 1.0%, and preferably about 0.6%, of Irish moss may be used, depending on the quality of improvement desired, and the amount, type and particle size of the suspended material. While 0.6% is the optimum concentration for Irish moss, considerably lower concentrations, such as 0.1% to 0.2%, suffice in certain cases to protect the mud against salt contamination.

The improved drilling fluids of the present invention may be prepared, preferably, by using an aqueous dispersion of Irish moss as part or whole of the liquid component in making up a mud with clay and other materials, or dry Irish moss may be incorporated in a prepared mud by violent agitation. It is preferable that Irish moss be dispersed as a protective agent in the drilling fluid prior to salt contamination since better results are obtained in this manner. For example, the water loss was 3.9 cc. at 45 minutes for a mud sample to which Irish moss and then salt was added, while for a mud sample to which the salt was added first the water loss amounted to 6.9 cc. in the same time. In locations where fresh water is unavailable, salt water, such as sea water and the like, may, however, be used. In instances where it is desired to drill with salt water muds, such as through heaving shale, even water saturated with salt may be used.

The Irish moss may be used in bleached or unbleached and in whole, ground, shredded or powdered form. Since the various forms are substantially the same in their effectiveness, the ground unbleached variety is preferred from the standpoint of economy and ease of dispersion.

A drilling fluid containing Irish moss shows improved plastering properties, including resistance to flocculation of the suspended colloids by salt contaminations or by increased temperature, as illustrated in the tables given hereinbelow. To samples of a base drilling fluid or mud, composed of a Ventura clay drilling fluid made up to a weight of about 79 lbs. per cu. ft., additions of various agents were made to show by comparison the improved properties of drilling muds prepared according to the present invention. Low values for the loss of water through a mud sheath formed at 100 lbs. pressure on a filter with an area of about 17.5 sq. cm. have been used as a measure of desirable plastering properties. The concentrations of salt are given in percent saturation of the water content of the drilling fluid and viscosities, when given, are in centipoises as measured in a Störmer viscosimeter.

Table I illustrates the effect of increasing amounts of salt contamination on quebracho-soda treated mud with and without Irish moss.

*Table I*

| Test No. | Addition to quebracho-soda treated base mud | Water loss in cc. at salt concentration shown | | | | | | |
|---|---|---|---|---|---|---|---|---|
| | | 0.0% salt | 0.5% salt | 1.0% salt | 2.0% salt | 5.0% salt | 10.0% salt | 90% salt |
| 1 | None | 20.5 | 22.5 | 23.7 | 27.7 | 32.5 | 35.2 | 35.9 |
| 2 | 0.6% Irish moss | 3.4 | 4.0 | 4.3 | 4.6 | 4.8 | 5.6 | 5.6 |

Table II shows the effect of temperature on treated muds and the improvement obtained by the addition of Irish moss.

*Table II*

| Test No. | Addition to quebracho-soda treated base mud having 90% salt saturation | Water loss at— | |
|---|---|---|---|
| | | 70° F. | 175° F. |
| 11 | None | 62.2 | 95.0 |
| 12 | 0.54% Irish moss | 3.3 | 13.3 |

Table III shows the relative water losses of variously-treated muds containing Irish moss and sodium alginate, comparative tests having been run before and after letting the drilling fluid stand for about eight days at about 100° F.

*Table III*

| Test No. | Addition to base mud | C. c. water loss | |
|---|---|---|---|
| | | Before | After |
| 21 | None | 35.2 | 36.7 |
| 22 | 0.3% Irish moss | 11.9 | 16.4 |
| 23 | 0.3% Irish moss+quebracho-soda | 10.6 | 5.2 |
| 24 | 0.3% Irish moss+pyrophosphate | 9.7 | 12.7 |
| 25 | 0.3% sodium alginate | 4.0 | 52.4 |
| 26 | 0.3% sodium alginate+quebracho soda | 5.0 | 15.4 |
| 27 | 0.3% sodium alginate+pyrophosphate | 4.0 | 25.8 |

Table III shows that Irish moss alone (test 22) is greatly superior to sodium alginate alone (test 25) after standing for several days, the increase in water loss for Irish moss-treated mud being only 38% as compared to 1210% for alginate-treated mud. A quebracho-soda treated mud containing alginate (test 26) shows an increase in water loss of 208% while a like treated mud containing Irish moss (test 23) shows a decrease in water loss of 51%.

Table IV illustrates the effect on the water loss and the mud viscosity by different additions to a series of samples of untreated, quebracho-soda treated and pyrophosphate-treated muds containing 3% salt; to one series of samples no addition is made; to another series Irish moss is added; to another a soluble alginate, sodium alginate, is added according to our above-mentioned copending application; and to still another series is added an insoluble alginate, i. e. calcium alginate, described in U. S. Patent No. 2,174,027 to Ball.

Table IV

| Test No. | Addition to base mud containing salt | Chemical treatment | | | | | |
|---|---|---|---|---|---|---|---|
| | | None | | Quebracho-soda | | Pyrophosphate | |
| | | Water loss | Viscosity | Water loss | Viscosity | Water loss | Viscosity |
| 31 | None | 26.8 | 20 | 20.3 | 20 | 26.3 | 19 |
| 32 | 0.3% Irish moss | 9.4 | 65 | 6.8 | 37 | 7.9 | 48 |
| 33 | 0.3% calcium alginate | 27.3 | 62 | 3.7 | 78 | 7.0 | 102 |
| 34 | 0.3% Na alginate | 19.7 | 42 | 6.9 | 30 | 8.4 | 40 |

It may be seen from Table IV above that the treating agents, such as quebracho-soda and pyrophosphate, which are commonly known as viscosity reducers, do not cause a substantial reduction in the viscosity of the drilling fluids but in some cases, such as in particular with calcium alginate (test 33), cause a great increase. It may be noted also that the water loss with untreated mud containing calcium alginate (test 33) is slightly greater than that for untreated mud alone (test 31), while the addition of Irish moss (test 32) to untreated mud causes a great decrease in the water loss.

Thus, it may be seen from the above tables that the plastering properties of straight drilling fluids or muds are markedly improved by the addition of small amounts of Irish moss with or without treatment with a compound of the class known as viscosity reducers, such as quebracho-soda. These tables further illustrate that formation salts flocculate the colloidal particles in ordinary untreated drilling fluids, and consequently prevent the development of a mud structure suitable for forming an impermeable mud sheath on the walls of the borehole. However, drilling fluids treated according to the present invention are not appreciably affected by salt contamination; that is, the treated fluids are able to form the desirable thin, impermeable mud sheath on the well walls due to a quasi-protective colloidal action of the Irish moss permitting the formation of a weak gel which is advantageous in promoting a thixotropic structure and subsequent formation of the desired mud sheath. This protective action of the Irish moss is likewise not greatly affected by high temperatures which tend to flocculate the colloidal particles or by standing for some time and, in fact, in conjunction with materials like quebracho-soda the action of Irish moss is improved with time.

The protective action of the Irish moss is not due to contained alginates since the mucilaginous substance obtained from Irish moss, according to the usual alginate extraction methods, differs from algin in that it is not precipitated by neutralization with acid or by calcium salts.

We claim as our invention:

1. In a process for drilling wells, the step of introducing and circulating in the drill hole a drilling fluid containing Irish moss in aqueous dispersion.

2. In a process for drilling a borehole through formations allowing an inflow of brine into the borehole, the step of circulating in the borehole a drilling fluid containing Irish moss dispersed therein.

3. In a process for drilling wells, the step of circulating in the drill hole a drilling fluid containing Irish moss dispersed therein, an alkali hydroxide and a water-soluble salt of an organic material of feebly acidic properties.

4. In a process for drilling a borehole through heaving shale formations, the step of circulating in the borehole a drilling fluid containing a high concentration of salt dissolved in the aqueous medium and Irish moss dispersed therein.

5. A drilling fluid comprising a colloidal material and Irish moss dispersed in an aqueous medium, having a high concentration of salt dissolved thterein.

6. In the process of drilling a borehole through formations having a temperature of about 175° F., the step of preventing temperature flocculation by circulating in the borehole a drilling fluid containing Irish moss dispersed therein.

7. In a process for drilling wells, the steps of circulating in the drill hole a drilling fluid containing Irish moss dispersed therein, and a viscosity reducer selected from the group consisting of water soluble alkali metal polyphosphate compounds.

8. In drilling oil and gas wells, the method of diminishing loss of water to the formation from a drilling fluid comprising a suspension of solid particles in water containing a substantial concentration of an electrolyte, comprising the step of adding Irish moss to the drilling fluid.

JOHN W. FREELAND.
HAROLD T. BYCK.